US010666726B2

(12) United States Patent
Tanaka et al.

(10) Patent No.: US 10,666,726 B2
(45) Date of Patent: May 26, 2020

(54) DATA PROCESSING SYSTEM, AND PROGRAM FOR MANAGING DATA

(75) Inventors: Jun Tanaka, Tokyo (JP); Ko Shimazawa, Tokyo (JP); Kosuke Yoshihara, Tokyo (JP); Keisuke Tatehara, Tokyo (JP)

(73) Assignee: WingArc1st Inc., Shibuya-ku, Tokyo (JP)

( * ) Notice: Subject to any disclaimer, the term of this patent is extended or adjusted under 35 U.S.C. 154(b) by 181 days.

(21) Appl. No.: 14/399,562

(22) PCT Filed: May 8, 2012

(86) PCT No.: PCT/JP2012/061719
§ 371 (c)(1),
(2), (4) Date: Nov. 7, 2014

(87) PCT Pub. No.: WO2013/168222
PCT Pub. Date: Nov. 14, 2013

(65) Prior Publication Data
US 2015/0113045 A1  Apr. 23, 2015

(51) Int. Cl.
*H04L 29/08* (2006.01)
*G06F 16/28* (2019.01)
*H04L 29/06* (2006.01)

(52) U.S. Cl.
CPC ........ *H04L 67/1095* (2013.01); *G06F 16/283* (2019.01); *H04L 67/42* (2013.01)

(58) Field of Classification Search
USPC ....................................................... 709/203
See application file for complete search history.

(56) References Cited

U.S. PATENT DOCUMENTS

| 6,570,563 | B1 | 5/2003 | Honda |
| 2003/0009538 | A1* | 1/2003 | Shah .................. H04L 63/0281 709/219 |

(Continued)

FOREIGN PATENT DOCUMENTS

| JP | H09-282219 A | 10/1997 |
| JP | 2000-330880 A | 11/2000 |

(Continued)

OTHER PUBLICATIONS

Ueno et al.; Browsing and searching HTML information by book metaphor; reports by Information Processing Society of Japan; Jan. 12, 1996; vol. 9, No. 2; pp. 37-44 (partial translation).

(Continued)

*Primary Examiner* — Umar Cheema
*Assistant Examiner* — Tony Williams
(74) *Attorney, Agent, or Firm* — Polsinelli PC

(57) ABSTRACT

In a server (10), all column data items are extracted from a master data storage unit (11) and sent to a client (20) in addition to target data corresponding to a data acquisition request that has been sent from the client (20), and in the client (20), the target data and data items received from the server (10) are displayed on a screen in a user-interface selectable mode, thereby making it possible to download from the server (10) to the client (20) the minimum target data required when attempting to perform a desired process on the client (20), and doing away with the waste associated with downloading all the data. In addition, by also downloading and displaying in a selectable manner on a screen data items pertaining to data other than the target data, a user can be shown, in an operable-like manner, data items pertaining to actual data without downloading the actual data.

8 Claims, 4 Drawing Sheets

(56) References Cited

U.S. PATENT DOCUMENTS

| | | | |
|---|---|---|---|
| 2004/0117377 A1* | 6/2004 | Moser | G06F 16/254 |
| 2004/0136244 A1* | 7/2004 | Nakamura | G06F 17/30775 |
| | | | 365/200 |
| 2006/0055968 A1* | 3/2006 | Sato | H04N 1/32358 |
| | | | 358/1.15 |
| 2006/0218111 A1* | 9/2006 | Cohen | G06F 17/30867 |
| | | | 706/45 |
| 2008/0195579 A1* | 8/2008 | Kennis | G06Q 10/06 |
| 2009/0292718 A1 | 11/2009 | Cuneo et al. | |
| 2010/0088317 A1* | 4/2010 | Bone | G06F 17/30144 |
| | | | 707/737 |
| 2010/0103243 A1* | 4/2010 | Won | H04M 1/72555 |
| | | | 348/14.02 |
| 2011/0138123 A1* | 6/2011 | Gurajada | G06F 17/30595 |
| | | | 711/118 |

FOREIGN PATENT DOCUMENTS

| | | |
|---|---|---|
| JP | 2001-142766 A | 5/2001 |
| JP | 2003-122618 A | 4/2003 |
| JP | 2003-150595 A | 5/2003 |
| JP | 2003-263356 A | 9/2003 |
| JP | 2004-252828 A | 9/2004 |
| JP | 2009-199148 A | 9/2009 |
| JP | 2011-524047 A | 8/2011 |

OTHER PUBLICATIONS

Extended European Search Report dated Nov. 13, 2015 in EP Application No. 12876149.1.

* cited by examiner

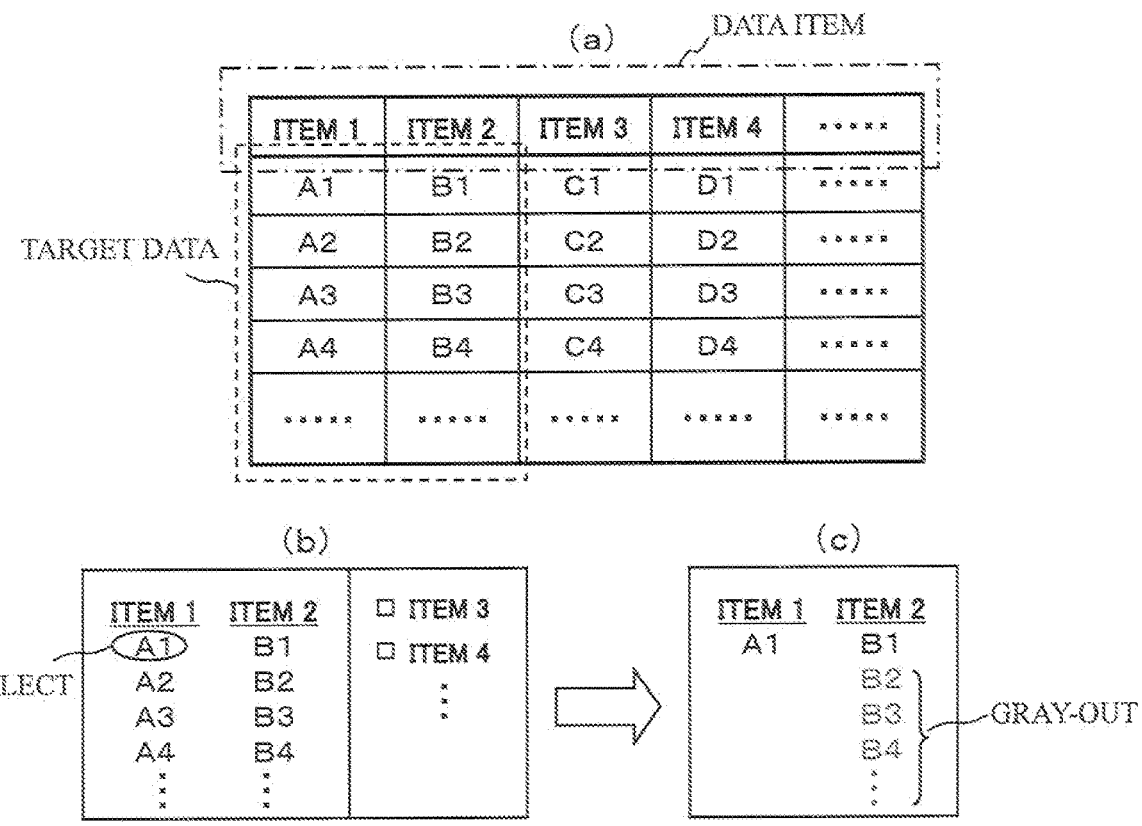

Fig. 4

| ITEM 1 (PRODUCT CATEGORY) | ITEM 2 (PRODUCT) | ..... |
|---|---|---|
| A1 (HOME ELECTRICAL APPLIANCES) | B1 (TELEVISION) | ..... |
| A3 (CLOTHES) | B32 (SWEATER) | ..... |
| A1 (HOME ELECTRICAL APPLIANCES) | B2 (REFRIGERATOR) | ..... |
| ..... | ..... | ..... |

Fig. 5

(a) DATA ITEM

| ITEM 1 | ITEM 2 | ITEM 3 | ITEM 4 | ..... |
|---|---|---|---|---|
| A1 | B1 | C1 | D1 | ..... |
| A2 | B2 | C2 | D2 | ..... |
| A3 | B3 | C3 | D3 | ..... |
| A4 | B4 | C4 | D4 | ..... |
| ..... | ..... | ..... | ..... | ..... |

TARGET DATA (b)

| ITEM 1 | ITEM 2 | ☐ ITEM 3 | SELECT |
|---|---|---|---|
| A1 | B1 | ☐ ITEM 4 | |
| A2 | B2 | : | |
| A3 | B3 | | |
| A4 | B4 | | |
| : | : | | |

DATA PROCESSING SYSTEM, AND PROGRAM FOR MANAGING DATA

CROSS REFERENCE TO RELATED APPLICATIONS

This application is a National Phase filing under 35 U.S.C. § 371 of PCT/JP2012/061719 filed on May 8, 2012, the entire contents of which are hereby incorporated by reference.

TECHNICAL FIELD

The present invention relates to a data processing system, a server, a client and a program for managing data.

BACKGROUND ART

Conventionally, a client and server type database system is offered. In the database system of this kind, a master database (hereinafter referred to as a maser DB) is provided in a server, a local database (hereinafter referred to as a local DB) is provided in a client, and data stored in the master DB is downloaded to the local DB of the client and desirable data processing is thus carried out in the client.

The data in the master DB is downloaded to the local DB of the client. Regardless of an open system to be operated in a web environment, therefore, the same data processing as that in connection to the server can be carried out in the client also in an offline state in which the client and the server are not connected through a network. In this case, however, it is necessary to guarantee integrity of the master DB and the local DB, and various mechanisms therefor are offered (for example, see Patent Documents 1 to 4).

Referring to the technique described in the Patent Document 1, there is provided means (a synchronous control section) for causing the data of the master DB and that of the local DB to be coincident with the newest contents. Also in the case in which addition, change, delete or the like of data occurs for the master DB of the server and the local DB of the client, consequently, it is possible to ensure integrity of the respective databases quickly and accurately.

Referring to the technique described in the Patent Document 2, the data stored in the master DB of the server is fetched and stored in the local DB of the client. The client executes specific processing by using local data, and carries out the same data processing over local data and master data corresponding to the local data. If the data processing is not normally ended, it is rolled back. Consequently, consistency of the master data and the local data is guaranteed.

Referring to the technique described in the Patent Document 3, every time the business application of the client refers to the data through the integrated database, the history of the data is registered as history information in the data history file. When the business application of the client is started, the history information is extracted from the data history file and is transmitted to the server. When the transmitted history information is different from the data version of the integrated database on the server side, data is extracted from the integrated database and is transferred to the client to update the integrated database on the client side. Consequently, useless data transfer or processing is omitted to increase a speed of processing.

Referring to the technique described in the Patent Document 4, when a retrieval request is made in the client, the client inquires the version of its own database to the server. When confirming that the version is the newest, the client retrieves its own database. On the other hand, when the client cannot confirm the newest version, it acquires the difference information about the database from the server and updates its own database and then carries out retrieval. Consequently, it is possible to suppress access to the server as greatly as possible.

Patent Document 1: Japanese Laid-Open Patent Publication No. 2001-142766
Patent Document 2: Japanese Laid-Open Patent Publication No. 2003-263356
Patent Document 3: Japanese Laid-Open Patent Publication No. 2000-330880
Patent Document 4: Japanese Laid-Open Patent Publication No. 2003-150595

DISCLOSURE OF THE INVENTION

When all of the data in the master DB are downloaded to the local DB in order to ensure the integrity of the data between the master DB of the server and the local DB of the client, however, there is a problem in that an enormous communication load is applied if a data volume is large. In particular, a recent database tends to have the number of rows and that of columns which are greatly increased, and the data volume is enormous. Accordingly, it is substantially impossible to download all of the enormous data from the server to the client.

On the other hand, by downloading only the difference information having different versions from the server to the client with reference to the version information of the database as in the Patent Documents 3 and 4, for example, it is possible to decrease a communication load to be applied to one downloading operation. Referring to the techniques described in the Patent Documents 3 and 4, however, the difference information having different versions are simply extracted. For this reason, the extracted information is not always necessary data for execution of certain data processing in the client.

In the first place, in addition to the techniques described in the Patent Documents 3 and 4, the conventional client and server type database system assumes that all of the data stored in the server are downloaded to the client to ensure the integrity of the data. When certain data processing is to be executed in the client, however, data required for the processing is not restricted to all of the master data stored in the server (and furthermore, the local data of the client taking integrity with the master data). In many cases, only a part of the master data is really necessary.

Regardless of the foregoing, it is wasteful that all of the master data in the server are downloaded and stored in the client. As described above, the transmission of unnecessary data, that is, even the difference information is wasteful for the data communication. Moreover, there is also a problem in that storage of enormous data including unused data in the client wastefully consumes memory resources of the client and causes a great load to be applied to various processing in the client.

Therefore, it is supposed that all of the master data in the server are not stored in the client by downloading but only necessary data for certain data processing is extracted and downloaded from the server to the client every time the processing is to be executed in the client. In this case, however, the processing can be carried out in only a closed data space formed by only the downloaded data. Consequently, it is impossible to continuously execute derivative processing which exceeds the data space.

For example, there will be considered the case in which only necessary data for desirable processing is downloaded from the server to the client based on a multidimensional structure model of "cube" to be a processing target in OLAP (online analytical processing). In this case, when data constituted by only a set of a data item (a dimension) and a quantitative value (a measure) which are required for processing to be executed by the client is downloaded as the cube depending on the processing, processing such as drilling, slicing or dicing can be performed within a range of the cube but processing such as a change or increase in the dimension cannot be carried out.

There is a greater problem in that a user cannot know which dimension is present on an outside of a closed cube formed by a limited dimension within a sphere of the cube. For this reason, there is a problem in that an operation of a database is considerably restricted and an operation feeling is very poor for the user.

In order to solve the problems, it is an object of the present invention to give such an operation feeling as to operate whole data in a server while eliminating waste such as an operation for downloading all of data stored in the server to a client and storing them therein.

In order to attain the object, in the present invention, data items related to target data coinciding with a data acquirement request transmitted from a client and data other than the target data are extracted from a master data storing section and are transmitted to the client in addition to the target data in a server of a client and server type database system. In the client, moreover, the target data and the data items received from the server are displayed in a selectable mode by a user interface on a screen.

According to the present invention having the structure described above, data to be downloaded from the server to the client is mainly target data coinciding with a data acquirement request. In other words, minimum target data required in execution of desirable data processing in the client is downloaded from the server to the client. Consequently, it is possible to eliminate such waste as to download all of the data stored in the master data storing section of the server to the client and to store them therein.

According to the present invention, moreover, data items related to data other than target data as well as a data item related to the target data are downloaded from the server to the client. Then, the data item is displayed in the selectable mode by a user interface on the screen through the client. For this reason, even if actual data on the data item is not downloaded to the client, which data item exists is presented to the user.

Although all data are not actually downloaded from the server to the client, consequently, the user can be caused to see the data items other than the data item related to the data acquirement request as if they can be operated. In addition, the user can actually carryout the operation for selecting the data items other than the data item related to the data acquirement request through a user interface. Consequently, it is possible to carry out a database operation beyond a restriction through a limited data space configured from the target data. Thus, it is possible to enhance an operation feeling of a database for the user.

BRIEF DESCRIPTION OF THE DRAWINGS

FIG. 2 is a table showing a structure of master data stored in a master data storing section of a server.

FIG. 3 is a table showing an example of an operation in the case in which an operation for selecting target data is carried out.

FIG. 4 is a table for explaining a specific example of the operation in the case in which the operation for selecting target data is carried out.

FIG. 5 is a table showing an example of an operation in the case in which an operation for selecting a data item related to data other than the target data is carried out.

BEST MODE FOR CARRYING OUT THE INVENTION

Figure 1:
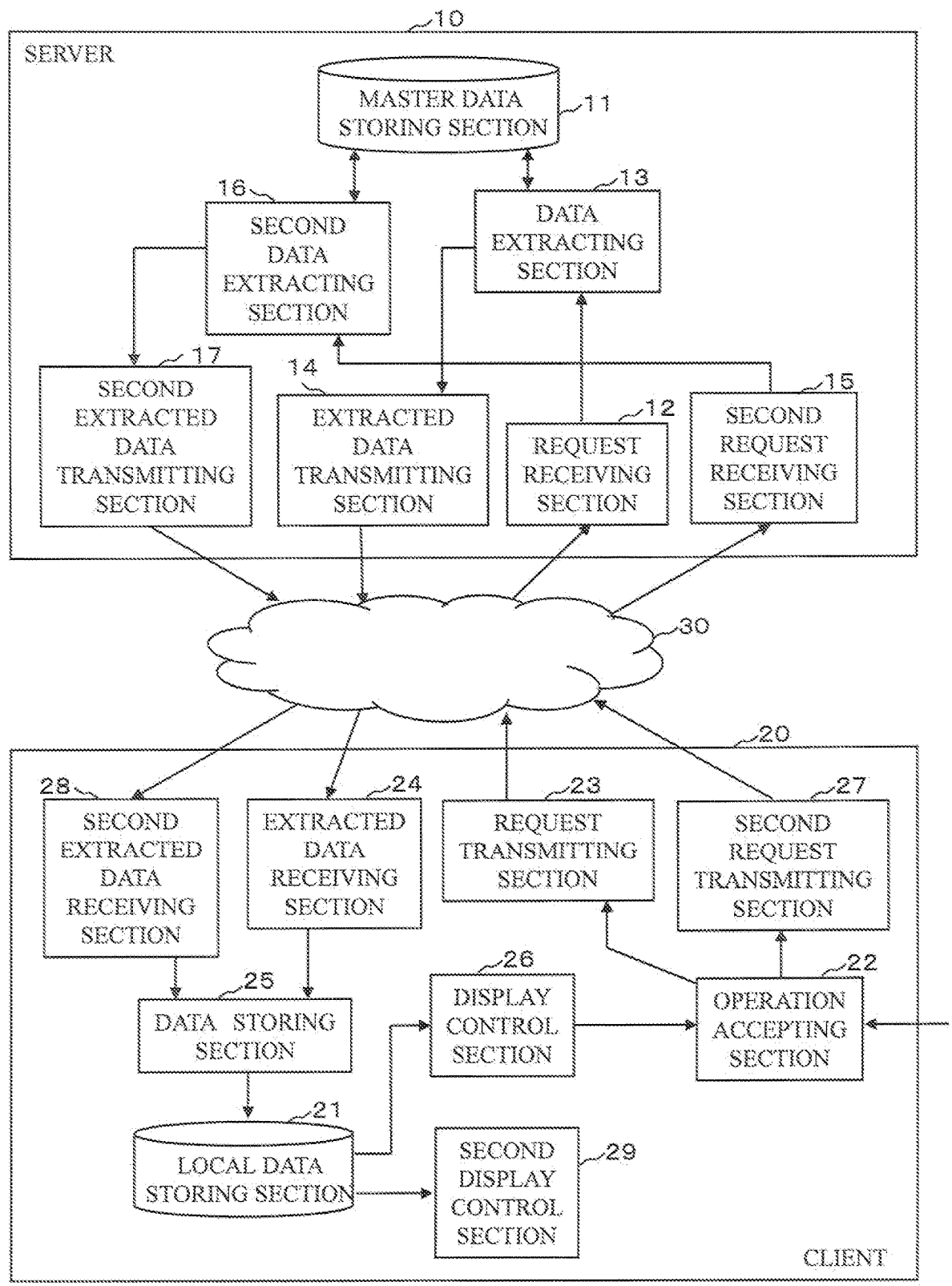
FIG. 1 is a diagram showing an example of a structure of a client and server type data processing system according to the present embodiment.

An embodiment according to the present invention will be described below with reference to the drawings. FIG. 1 is a diagram showing an example of a structure of a client and server type data processing system according to the present embodiment. The data processing system according to the present embodiment has a structure in which a server 10 and a client 20 are connected through a communication network 30, data stored in a master data storing section 11 provided in the server 10 is downloaded to the client 20, and desirable data processing can be carried out in the client 20.

As shown in FIG. 1, the server 10 includes, as a functional structure thereof, the master data storing section 11, a request receiving section 12, a data extracting section 13, an extracted data transmitting section 14, a second request receiving section 15, a second data extracting section 16 and a second extracted data transmitting section 17.

Moreover, the client 20 includes, as a functional structure thereof, a local data storing section 21, an operation accepting section 22, a request transmitting section 23, an extracted data receiving section 24, a data storing section 25, a display control section 26, a second request transmitting section 27, a second extracted data receiving section 28 and a second display control section 29.

In the present embodiment, it is assumed that master data to be stored in the master data storing section 11 of the server 10 and local data to be stored in the local data storing section 21 of the client 20 are configured from multidimensional structure models referred to as "cubes", all of which are operation targets through OLAP. For example, there is employed a structure in which data is acquired from a database on another server which is not shown and a cube is thus created on the server 10, and the cube is also created on the client 20.

A program for managing data which operates the data processing system according to the present embodiment is installed into each of the server 10 and the client 20. The respective functional structures 12 to 17 provided in the server 10 and the respective functional structures 22 to 29 provided in the client 20 are implemented by the program for managing data. In this case, the functional structures 12 to 17 of the server 10 and the functional structures 22 to 29 of the client 20 are actually configured from a CPU or an MPU, an RAM, an ROM and the like in a computer respectively, and are implemented by an operation of the program for managing data stored in the RAM, the ROM or the like.

For a recording medium which stores the program for managing data, it is possible to use a CD-ROM, a flexible disk, a hard disk, a magnetic tape, an optical disk, a magneto-optical disk, a DVD, a nonvolatile memory card or the like in addition to the RAM or the ROM. Moreover, the implementation can also be carried out by downloading the program for managing data to the server 10 or the client 20 through a network such as internet.

The operation accepting section 22 of the client 20 accepts an operation related to various instructions, information input or the like which are to be given to the client 20 by a user through an operating device such as a keyboard or a mouse. For example, the operation accepting section 22 accepts an operation for giving an instruction for acquiring data on a desirable data item from the server 10. Alternatively, the operation accepting section 22 accepts an operation for inputting a desirable retrieval kay to acquire data coinciding with the retrieval key from the server 10 by the user.

The request transmitting section 23 transmits a data acquirement request to the server 10 in response to the operation accepted by the operation accepting section 22. In other words, the request transmitting section 23 transmits, to the server 10, a data acquirement request for requesting acquirement of data on a desirable data item from the server 10, a data acquirement request for requesting acquirement of data coinciding with a retrieval key from the server 10, or the like. The request receiving section 12 of the server 10 receives a data acquirement request transmitted from the client 20.

The data extracting section 13 extracts, from the master data storing section 11, target data coinciding with the data acquirement request received by the request receiving section 12, and furthermore, extracts, from the master data storing section 11, data items related to the extracted target data and the other data. In the present embodiment, the extracted target data and the data items are configured from a cube. Processing contents of the data extracting section 13 will specifically be described with reference to FIG. 2.

FIG. 2 is a table showing a structure of the master data stored in the master data storing section 11. As shown in FIG. 2, the master data storing section 11 stores master data including a plurality of rows and a plurality of columns. Data items, for example, an item 1, an item 2, an item 3 and the like are stored in respective columns configuring a first row.

Moreover, actual data on each column is stored in and after a second row. For example, data (A1, A2, A3, A4 and the like) in and after the second row of a first column are actual data on the data item of the item 1. Moreover, data (B1, B2, B3, B4 and the like) in and after the second row of a second column are actual data on the data item of the item 2.

The target data to be extracted from the master data storing section 11 by the data extracting section 13 is actual data which coincides with the data acquirement request. For example, in the case in which a data acquirement request for requesting acquirement of data on the items 1 and 2 from the server 10 is transmitted from the client 20, the data extracting section 13 extracts, as the target data, the actual data (A1, A2, A3, A4 and the like) on the item 1 and the actual data (B1, B2, B3, B4 and the like) on the item 2.

In the case in which a data acquirement request for requesting acquirement of data coinciding with the retrieval key from the server 10 is transmitted from the client 20, moreover, the data extracting section 13 extracts, as the target data, actual data coinciding with the retrieval key from actual data (A1, A2, A3, A4 and the like), (B1, B2, B3, B4 and the like), (C1, C2, C3, C4 and the like) and (D1, D2, D3, D4 and the like) on the respective columns in and after the second row.

On the other hand, the data items to be extracted from the master data storing section 11 by the data extracting section 13 are data items related to the target data extracted as described above and the other data. For example, in the case in which a data acquirement request for requesting acquirement of the data on the items 1 and 2 from the server 10 is transmitted from the client 20, the data items related to the target data extracted from the data extracting section 13 include two items, that is, the items 1 and 2.

In the present embodiment, the data extracting section 13 extracts data items related to data other than the extracted target data in addition to the items 1 and 2 related to the target data. For example, the data extracting section 13 extracts, from the master storing section 11, all of data items included in the master data storing section 11 (data items in all of the columns configuring the first row of the master data).

The extracted data transmitting section 14 transmits, to the client 20, the target data and the data item extracted from the data extracting section 13. The target data to be transmitted are not equivalent to all of the data stored in the master data storing section 11 but a part of the data coinciding with the data acquirement request. Although the data item is related to all of the columns, moreover, it is data corresponding to a single row at most. Even if the master data is configured from several thousand to several ten thousand columns, therefore, a data volume thereof is not very large. For this reason, even if the target data and the data items in all of the columns are added, a data volume thereof is not a great hindrance to the transmission through the communication network 30.

The extracted data receiving section 24 of the client 20 receives the target data and the data item transmitted from the server 10. The data storing section 25 stores, in the local data storing section 21, the target data and the data item received from the server 10 by the extracted data receiving section 24.

As described above, the data items transmitted from the server 10 and stored in the local data storing section 21 include data items related to the data other than the target data as well as the data item related to the target data coinciding with the data acquirement request. In the present embodiment, there are included all of the data items contained in the master data storing section 11 of the server 10 (the data items in all of the columns configuring the first row of the master data).

The display control section 26 causes a display (not shown) to display, on a screen, the target data and the data items stored in the local data storing section 21 in a selectable mode by a user interface. The target data may be processed and displayed in a predetermined mode on the screen.

The target data processing indicates charting, graphing or the like, for example. Alternatively, the processing may be simple listing. Moreover, the selectable mode by a user interface indicates a mode for displaying a name of target data or a data item as a selective operable GUI, a mode for displaying a selecting check box or radio button together with the name of the target data or the data item, or the like. The modes described above are only illustrative and the present invention is not restricted thereto.

In the present embodiment, it is possible to actually select the target data or the data item related to the target data which is stored in the local data storing section 21 through a user interface, thereby carrying out a desirable operation. In the case in which any of the target data displayed on the screen is selected by the user interface, the display control section 26 may subsequently display only the selected target data and the other target data stored in the same row on the master data storing section 11 in a continuous selectable mode by a user interface on the screen and bring the other target data into a gray-out state so as to be unselectable.

For example, it is assumed that the actual data (A1, A2, A3, A4 and the like) on the item 1 and the actual data (B1, B2, B3, B4 and the like) on the item 2 are extracted as target data from the master data storing section 11 by the data extracting section 13 of the server 10, and furthermore, the data items in all of the columns on the first row of the master data are extracted from the master data storing section 11 by the data extracting section 13 of the server 10 and they are transmitted to the client 20 as shown in FIG. 3(a), and the actual data and the data items are displayed in the selectable mode by a user interface as shown in FIG. 3(b).

In the case in which the actual data A1 on the item 1 is selected by the user interface, for example, the display control section 26 displays, on the screen, only the selected actual data A1 and the other actual data B1 on the item 2 stored in the same row on the master data storing section 11 in a continuous selectable mode by a user interface as shown in FIG. 3(c). The other actual data (B2, B3, B4 and the like) on the item 2 are brought into a gray-out state so as to be unselectable.

Thus, only the actual data B1 which might be continuously selected in relation to the actual data A1 of the item 1 selected by the user interface is further displayed in a selectable state and the other actual data can be brought into the gray-out state. Consequently, it is possible to cause a user's operation for the actual data to be convenient.

For example, it is assumed that the item 1 indicates a product category and the item 2 indicates a specific product. Moreover, it is assumed that the actual data A1, A2, A3 and the like on the item 1 (product category) are set to be A1=home electrical appliances, A2=personal computer, A3=clothes and the like, for example. Furthermore, it is assumed that the actual data B1, B2, B3 and the like on the item 2 (a product) are set to be B1=television, B2=refrigerator, B3=vacuum cleaner and the like, for example.

In the case in which the actual data stored in the local data storing section 21 is configured as shown in FIG. 4, the display control section 26 displays, on the screen, the selected actual data A1 and the other actual data B1 (television) and B2 (refrigerator) on the item 2 stored in the same row on the master data storing section 11 in the continuous selectable mode by a user interface when the actual data A1 (home electrical appliances) on the item 1 is selected by the user interface. Actual data B32 (sweater) on the other item 2 is brought into the gray-out state so as to be unselectable. In other words, narrowing can be carried out in such a manner that only products belonging to the selected category of the home electrical appliances can be selected.

To the contrary, in the case in which the actual data B1 (television) on the item 2 is selected by the user interface, the display control section 26 displays, on the screen, the selected actual data B1 and the other actual data A1 (home electrical appliances) on the item 1 stored in the same row on the master data storing section 11 in the continuous selectable mode by a user interface. The actual data A3 (clothes) on the other item 1 is brought into the gray-out state so as to be unselectable. According to the present embodiment, thus, reverse narrowing can also be carried out in such a manner that it is possible to select, from specific products, only categories to which they belong.

In the present embodiment, although the actual data is not stored in the local data storing section 21, the data items themselves related to the data other than the target data stored in the local data storing section 21 are displayed in the selectable mode on the screen. In other words, the data items having no actual data stored in the local data storing section 21 (the data items related to the data other than the target data) can be seen to the user as if an operation can be carried out. In addition, the user can actually perform an operation for selecting a data item having no actual data in the local data storing section 21 through the user interface.

The operation accepting section 22 also accepts an operation for selecting the data items having no actual data in the local data storing section 21 (the data items related to the data other than the target data) as well as the data items having the actual data in the local data storing section 21 (the data items related to the target data).

In the case in which the data item displayed on the screen by the display control section 26 is selected by the user interface, the second request transmitting section 27 transmits, to the server 10, a second data acquirement request for requesting acquirement of actual data on the selected data item when the selected data item is any of the data items related to the data other than the target data.

The second request receiving section 15 in the server 10 receives the second data acquirement request transmitted from the client 20. The second data extracting section 16 extracts, from the master data storing section 11, second target data coinciding with the second data acquirement request received by the second request receiving section 15. The second extracted data transmitting section 17 transmits, to the client 20, the second target data extracted by the second data extracting section 16.

The second extracted data receiving section 28 in the client 20 receives the second target data transmitted from the server 10 in response to the second data acquirement request. The data storing section 25 adds the second target data received from the server 10 by the second extracted data receiving section 28 to the stored target data and the data items in all of the columns, and stores them in the local data storing section 21.

When adding the second target data to the local data storing section 21 and storing them therein, the data storing section 25 adds the second target data to be stored additionally to the stored target data and the data items in all of the columns, thereby rebuilding a cube of OLAP newly.

The cube can be built at a higher speed by the high performance server 10. Therefore, the cube may be rebuilt by the server 10. In other words, a cube constituted by the target data and the data items in all of the columns extracted by the data extracting section 13 is saved in the server 10. When the second data extracting section 16 extracts the second target data, the newly extracted second target data may be added to the saved target data and the data items in all of the columns to rebuild the cube of the OLAP newly and the second extracted data transmitting section 17 may transmit the cube to the client 20.

The second display control section 29 displays the second target data stored newly in the local data storing section 21 in a predetermined mode on the screen. In this case, the predetermined mode serves to preview display actual data corresponding to the data item selected by the user interface differently from a display mode such as charting or graphing to be carried out over the target data by the display control section 26.

In this case, the preview display is list display indicating which actual data is possessed by the data item, for example.

By the preview display, it is sufficient to know what actual data is possessed. For this reason, when the second data extracting section 16 is to extract the data from the master data storing section 11 in response to the second data acquirement request, any of data on the data items which is selected by the user interface and has overlap eliminated is preferably extracted as the second target data from the master data storing section 11.

For example, it is assumed that the actual data (A1, A2, A3, A4 and the like) on the item 1 and the actual data (B1, B2, B3, B4 and the like) on the item 2 are extracted as target data from the master data storing section 11, and furthermore, the data items in all of the columns on the first row of the master data are extracted from the master data storing section 11 by the data extracting section 13 of the server 10 and they are transmitted to the client 20 as shown in FIG. 5(*a*), and the actual data and the data items are displayed in the selectable mode by a user interface through the display control section 26 of the client 20 as shown in FIG. 5(*b*).

For example, it is assumed that the data item of the item 3 of which actual data is not transmitted is selected by the user interface and the second data acquirement request is then transmitted to the server 10. In this case, the second data extracting section 16 of the server 10 extracts, as the second target data from the master data storing section 11, any of the actual data (C1, C2, C3, C4 and the like) on the item 3 from which overlap is eliminated. If actual data on a fourth row is not C3 but C2, the second data extracting section 16 extracts the actual data (C1, C2, C4 and the like) on the item 3 from the master data storing section 11 (only one of C2 is extracted).

Moreover, the second data extracting section 16 may extract, as the second target data from the master data storing section 11, any of the data on the data item selected by the user interface from which overlap is eliminated, and a number of data which can be preview displayed on a screen without scroll by the second display control section 29.

As a matter of course, a number of data which cannot fall into the screen without scroll may be extracted. In that case, it is possible to display all of the extracted data by scrolling. From a viewpoint that it is sufficient to know an outline of the actual data in preview display, however, it is possible to reduce a communication data volume from the server 10 to the client 20 by carrying out narrowing into the number of data which can be displayed on the screen without scroll and extracting the data.

Figure 6:
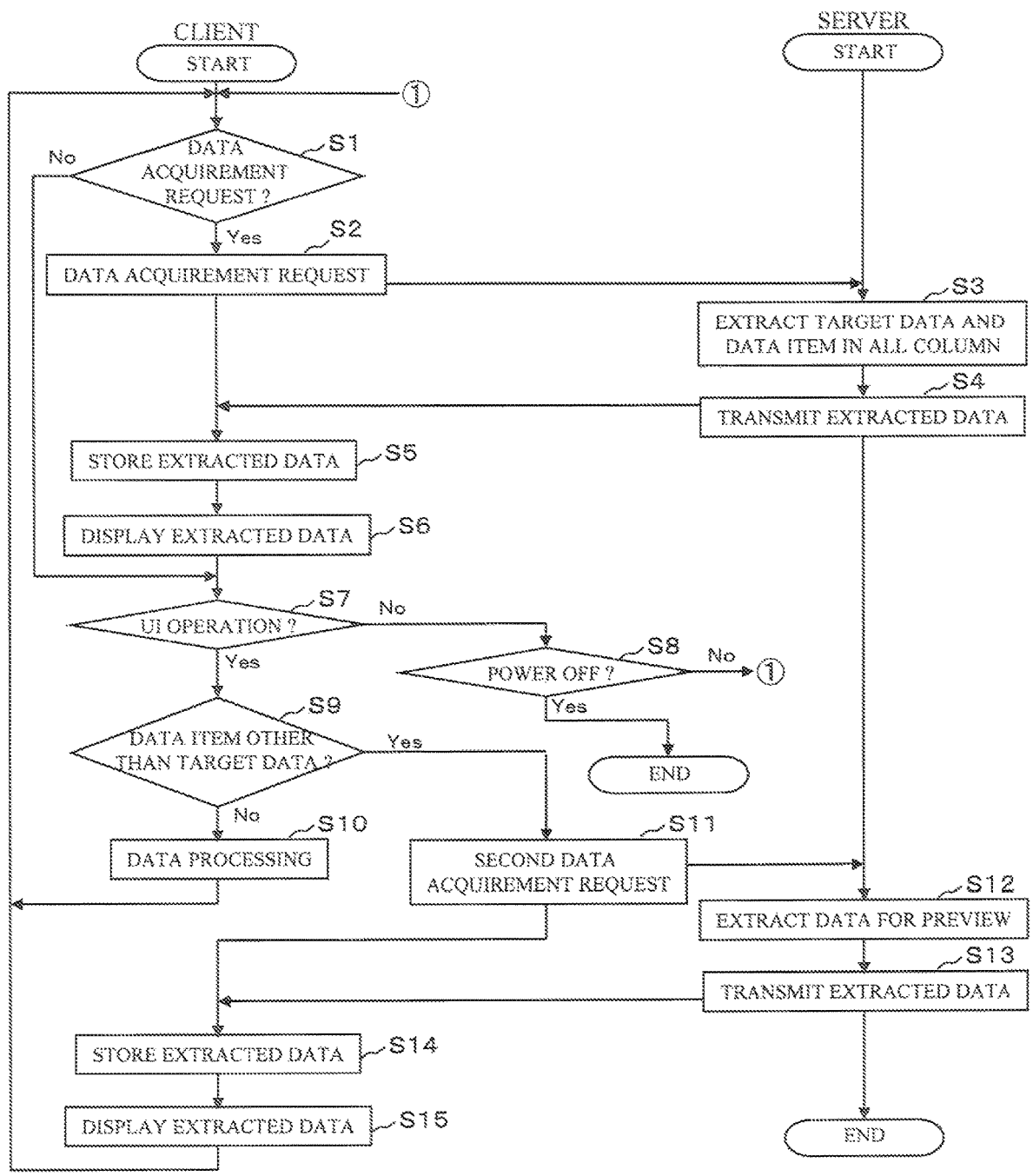
FIG. 6 is a flowchart showing an example of an operation of the data processing system according to the present embodiment.

FIG. 6 is a flowchart showing an example of an operation of the data processing system according to the present embodiment having the structure described above. The flowchart shown in FIG. 6 is started when the program for managing data in the client 20 is activated.

First of all, the operation accepting section 22 of the client 20 decides whether an operation for giving an instruction for acquiring desirable data (for example, data on a desirable data item or data coinciding with a desirable retrieval key) from the server 10 is carried out or not (Step S1). If the operation is carried out, the request transmitting section 23 transmits, to the server 10, a data acquirement request for requesting acquirement of the desirable data from the server 10 (Step S2).

In the server 10, when the request receiving section 12 receives the data acquirement request transmitted from the client 20, the data extracting section 13 extracts target data coinciding with the data acquirement request from the master data storing section 11 and extracts, from the master data storing section 11, the data items in all of the columns configuring the first row of the master data (Step S3).

The extracted data transmitting section 14 transmits, to the client 20, the target data and the data item extracted by the data extracting section 13 (Step S4). In the client 20, when the extracted data receiving section 24 receives the target data and the data item transmitted from the server 10, the data storing section 25 stores the received data in the local data storing section 21 (Step S5).

Subsequently, the display control section 26 displays the target data and the data items in all of the columns stored in the local data storing section 21 in the selectable mode by a user interface on the screen (Step S6). In a state in which the screen display is thus carried out, the operation accepting section 22 decides whether the operation for selecting the target data or the data item displayed on the screen is carried out by a user interface or not (Step S7).

If the operation is not carried out, the operation accepting section 22 decides whether an operation for ending the program for managing data in the client 20 is carried out or not (Step S8). If the program ending operation is not carried out, the processing returns to the Step S1. If it is decided that the operation for giving an instruction for acquiring desirable data is not carried out in the Step S1, the processing makes a transition to the Step S7. Consequently, the decisions in the Steps S1, S7 and S8 are repeated until any operation is carried out. If the program ending operation is carried out, the processing of the flowchart shown in FIG. 6 is ended.

On the other hand, if it is decided that the operation for selecting any of the target data or the data items displayed on the screen is carried out in the Step S7, the operation accepting section 22 further decides whether the operation is an operation for the data items having no actual data in the local data storing section 21 (the data items related to the data other than the target data) or not (Step S9).

If the operation is an operation for the target data or an operation for the data item related to the target data, the data processing of the local data storing section 21 is executed depending on contents of the operation (Step S10). The data processing is processing such as charting or graphing of the target data which is to be carried out by the display control section 26, for example. Alternatively, a mode of the data processing also includes modification of the target data, desirable calculation using the target data and the like. After the data processing is executed, the processing returns to the Step S1.

On the other hand, if the operation accepting section 22 decides that the operation is the operation for the data items related to the data other than the target data, the second request transmitting section 27 transmits, to the server 10, a second data acquirement request for requesting acquirement of data on the selected data item (Step S11).

In the server 10, when the second request receiving section 15 receives the second data acquirement request transmitted from the client 20, the second data extracting section 16 extracts, as data for preview, second target data coinciding with the second data acquirement request from the master data storing section 11 (Step S12). Then, the second extracted data transmitting section 17 transmits, to the client 20, the second target data extracted by the second data extracting section 16 (Step S13).

In the client 20, when the second extracted data receiving section 28 receives the second target data transmitted from the server 10, the data storing section 25 adds the second target data to the target data and the data items in all of the columns which have already been stored and stores them in the local data storing section 21 (Step S14).

Subsequently, the second display control section 29 preview displays, on a display which is not shown, the second target data stored newly in the local data storing section 21 (Step S15). After the preview display is carried out, the processing returns to the Step S1. In the case in which a user wants to acquire all of actual data on a certain data item from the server 10 in respect of the second target data preview displayed for the data item, it is sufficient to carry out an operation for giving an instruction for acquiring the data on the data item from the server 10.

As described above in detail, in the present embodiment, the data extracting section 13 of the server 10 extracts, from the master data storing section 11, data items related to target data coinciding with a data acquirement request transmitted from the client 20 and the other data in addition to the target data, and transmits them to the client 20. Moreover, the client 20 displays the target data and data items received from the server 10 in a selectable mode by a user interface on the screen.

According to the data processing system in accordance with the present embodiment which is thus configured, data to be downloaded from the server 10 to the client 20 is mainly target data coinciding with a data acquirement request. In other words, minimum target data required in execution of desirable data processing in the client 20 is downloaded from the server 10 to the client 20. Consequently, it is possible to eliminate such waste as to download all of the data stored in the master data storing section 11 of the server 10 to the client 20 and to store them therein.

According to the data processing system in accordance with the present embodiment, moreover, data items related to data other than target data as well as a data item related to the target data are downloaded from the server 10 to the client 20. Then, the data item is displayed in the selectable mode by a user interface on the screen through the client 20. For this reason, even if actual data on the data item is not downloaded to the client 20, which data item exists is presented to the user.

Although all data are not actually downloaded from the server 10 to the client 20, consequently, the user can be caused to see the data items related to the data other than the target data as if they can be operated. In addition, the user can actually carry out the operation for selecting the data items related to the data other than the target data through the user interface. Consequently, it is possible to carry out a data operation beyond a restriction through a limited data space configured from the target data. Thus, it is possible to enhance an operation feeling for the user.

For example, when the operation for selecting the data items related to the data other than the target data is carried out, the second data acquirement request for requesting acquirement of data on the selected data item is transmitted to the server 10 and the second target data coinciding with the second data acquirement request is downloaded to the client 20 and is preview displayed in response thereto. A data volume to be downloaded from the server 10 to the client 20 is very small in order to carry out the preview display. For this reason, a communication load is made small.

In the case in which the user sees the preview display and finds necessity, moreover, it is also possible to newly give the server 10 a request for acquiring data on a data item which is preview displayed and to download the data. A data volume to be downloaded at this time is also very small and a communication load is made small.

In short, according to the data processing system in accordance with the present embodiment, it is possible to give the user an operation feeling as if all of the data are downloaded to the local data storing section 21 while downloading only a part of the data to relieve a communication load without downloading the data stored in the master data storing section 11 of the server 10 to the local data storing section 21 of the client 20 in a lump.

By interactive processing between the server 10 and the client 20, it is possible to download and compensate for data which is desired by the user and is not stored in the local data storing section 21 at any time. A communication load required for the downloading is also made extremely small. Consequently, it is possible to seamlessly carry out an actual data operation for all of the data stored in the master data storing section 11 with such high response that the user does not feel occurrence of communication at each time between the server 10 and the client 20.

Although there has been described the example in which the master data to be stored in the master data storing section 11 of the server 10 and the local data to be stored in the local data storing section 21 of the client 20 are configured from the cube of the OLAP in the embodiment, the present invention is not restricted thereto.

Although there has been described the example in which the data items in all of the columns configuring the first row of the master data are extracted in the embodiment, moreover, the data items in all of the columns do not need to be extracted. As described above, however, the data volume is not greatly increased even if the data items in all of the columns are extracted. For this reason, it is preferable to extract the data items in all of the columns in order to obtain the operation feeling of the whole master data.

In the embodiment, moreover, there has been described the example in which the second target data on the data items related to the data other than the target data (the actual data from which overlap is eliminated) is downloaded from the server 10 to the client 20 and is preview displayed when the data items are selected. However, the preview display is not indispensable. For example, it is also possible to immediately download all of the actual data on the selected data items (the actual data from which the overlap is not eliminated).

In addition, the embodiment is only illustrative for concreteness to carry out the present invention and the technical scope of the present invention should not be thereby construed to be restrictive. In other words, the present invention can be carried out in various configurations without departing from the gist or main features thereof.

The invention claimed is:

1. A client and server type data processing system having a structure in which a client and a server are connected through a network, data stored in a master data storing section provided in the server is downloaded to the client, and desirable data processing can be carried out by the client, the server being electronic computer hardware in combination with software, the system comprising:

the server programmed to:
store in the master data storing section a plurality of groups of data in format of columns and rows, each column including actual data and a data item identifier that identifies the group, the data identifier of each column being in a specific row of the each column;
receive a data acquirement request transmitted from the client;
search, in response to receipt of the data acquirement request, the plurality of groups of data for any columns of data that are responsive to the data acquirement request and any columns of data that are not responsive to the data acquirement request:
first extract, in response to the search, as primary target data at least one column of data including the actual data and the data item identifier from the master data storing section that the search identified as responsive to the data acquirement request;
second extract, in response to the search and simultaneously with the first extract, as secondary additional data a data item identifier from at least one column of data that the search identified as not responsive to the data acquirement request, from the specific row of the other columns that are different from at least one column subject to the first extract, without extracting actual data from other rows of the at least one column of data that the search identified as not responsive to the data acquirement request; and
transmit, to the client, as search results for the data acquirement request, the primary target data and secondary additional data, the transmitted search results lacking actual data from other rows of the at least one column of data that the search identified as not responsive to the data acquirement request as such actual data was not extracted during the second extracting, and the client programmed to:
transmit the data acquirement request to the server;
receive the primary target data and secondary additional data transmitted from the server;
store, in a local data storing section, the received primary target data and secondary additional data; and
simultaneously display, as search results of the data acquirement request, the primary target data and secondary additional data in a selectable mode by a user interface on a screen;
wherein the displayed secondary additional data includes the at least one data item identifier from the specific row of the other columns subject to the second extract, but does not include actual data from the other rows of the other columns; and
wherein display by the client of actual data from the other rows of the other columns of data requires sending an independent data acquirement request to the server.

2. The data processing system according to claim 1, wherein the sever is further programmed to extracts all of the data item identifiers included in the master data storing section during the first and second extract.

3. The data processing system according to claim 1, wherein the client is further programmed to:
receive a selection of the displayed at least one data item identifier of the secondary additional data;
transmit, to the server, a second data acquirement request for requesting acquisition of actual data on the selection;
receive second actual data as secondary target data transmitted from the server in response to the second data acquirement request; and
displaying the second actual data received in a predetermined mode on the screen, and
the server is further programmed to:
receive the second data acquirement request transmitted from the client;
extract the second actual data as the secondary target data from the master data storing section responsive to the second data acquirement request; and
transmit, to the client, the second actual data extracted.

4. The data processing system according to claim 3, wherein the server is further programmed to, in response to the second data acquirement request, extract actual data excluding redundancy among actual data belonging to the column related to the data item identifier selected by the user interface, from the master data storage unit as secondary target data, and
the client is further programmed to preview data corresponding to the data item identifier selected by the user interface using the secondary target data.

5. The data processing system according to claim 4, wherein server is further programmed to, in response to the second data acquirement request, exclude from the second actual data content that cannot be preview displayed on a screen without scroll on the client device and extract the secondary target data.

6. The data processing system according to claim 1, wherein the client is further programmed to display the target data stored in the local data storing section in the selectable mode by a user interface on the screen, and to display only selected target data and other target data stored in the same row on the master data storing section in a continuous selectable mode by a user interface on the screen when any of the target data displayed on the screen is selected by the user interface.

7. A server connected to a client through a network for downloading data stored in a master data storing section to the client in response to a request given from the client, the server being th electronic computer hardware in combination with software programmed to perform steps comprising:
storing in the master data storing section a plurality of groups of data in format of columns and rows, each column including actual data and a data item identifier that identifies the group, the data identifier of each column being in a specific row of the each column;
receiving a data acquirement request transmitted from the client;
searching, in response to receipt of the data acquirement request, the plurality of groups of data for any columns of data that are responsive to the data acquirement request and any columns of data that are not responsive to the data acquirement request:
first extracting, in response to the search, as primary target data at least one column of data including the actual data and the data item identifier from the master data storing section that the search identified as responsive to the data acquirement request;
second extracting, in response to the search and simultaneously with the first extracting, as secondary additional data a data item identifier from at least one column of data that the search identified as not responsive to the data acquirement request, from the specific row of the other columns that are different from at least one column from the master data storing section, without extracting actual data from other rows of the at least one column of data that the search identified as not responsive to the data acquirement request; and
transmitting, to the client as search results for the data acquirement request, the primary target data and secondary additional data, the transmitted search results lacking actual data from other rows of the at least one column of data that the search identified as not responsive to the data acquirement request as such actual data was not extracted during the second extracting; and wherein transmission of actual data from other rows of the other columns corresponding to the data item identifiers requires receiving an independent data acquirement request at the server.

8. A server in a client and server type data processing system having a structure in which a client and the server are connected through a network, data stored in a master data storing section provided in the server is downloaded to the client, and desirable data processing, the server being electronic computer hardware in combination with software programmed to perform steps comprising:
store in the master data storing section a plurality of groups of data in a format of columns and rows, each group including a column with row of actual data and a row of a data item identifier that identifies the group;
receive a data acquirement request transmitted from the client;
search, in response to receipt of the data acquirement request, the plurality of groups of data for any columns of data that are responsive to the data acquirement request and any columns of data that are not responsive to the data acquirement request:
first extract, in response to the search, as primary target data at least one column of data including the actual data and the data item identifier from the master data storing section that the search identified as responsive to the data acquirement request;
second extract, in response to the search and simultaneously with the first extract, as secondary additional data at least one data item identifiers from at least one column of data that the search identified as not responsive to the data acquirement request, from the specific row of the other columns that are different from at least one group subject to the first extract, without extracting actual data from the other rows of the at least one column of data that the search identified as not responsive to the data acquirement request; and
transmit, to the client as search results for the data acquirement request, the primary target data and secondary additional data, the transmitted search results lacking actual data from other rows of the at least one column of data that the search identified as not responsive to the data acquirement request as such actual data was not extracted during the second extracting and; and
wherein transmission of actual data from the other rows in the other columns requires receiving an independent data acquirement request at the server.

* * * * *